(12) United States Patent
Erera et al.

(10) Patent No.: US 8,078,628 B2
(45) Date of Patent: Dec. 13, 2011

(54) STREAMING FACETED SEARCH

(75) Inventors: Shai Erera, Kiryat Ata (IL); Nadav Y. Har'el, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/046,500

(22) Filed: Mar. 12, 2008

(65) Prior Publication Data
US 2009/0234849 A1    Sep. 17, 2009

(51) Int. Cl.
*G06F 7/00* (2006.01)
*G06F 17/30* (2006.01)

(52) U.S. Cl. ......................................... 707/752

(58) Field of Classification Search .................. None
See application file for complete search history.

(56) References Cited

U.S. PATENT DOCUMENTS

| | | | |
|---|---|---|---|
| 2006/0064411 A1* | 3/2006 | Gross et al. ............. | 707/3 |
| 2006/0095412 A1 | 5/2006 | Zito | |
| 2006/0101009 A1 | 5/2006 | Weber | |
| 2006/0106793 A1 | 5/2006 | Liang | |
| 2007/0067305 A1 | 3/2007 | Ives | |
| 2007/0226189 A1 | 9/2007 | Piekos | |
| 2008/0071763 A1* | 3/2008 | Ferrenq et al. .......... | 707/5 |

* cited by examiner

*Primary Examiner* — Kavita Padmanabhan

(57) ABSTRACT

Systems and methods for streaming faceted search are provided. In accordance with one embodiment, an exemplary method comprises receiving a search query; processing the search query to find matching search results and facet information corresponding to the search query, wherein the facet information is not part of the search query, but is used to group the search results into a plurality of sets, such that each set corresponds to a facet value range common to the search results included in said set, so that the search results are filtered based on certain criteria and sortable based on the facet value ranges associated with each set; designating at least a first output stream and a second output stream, wherein data related to the matching search results for the search query is written to the first output stream, and data related to at least a first facet information is written to the second output stream, so that the matching search results for the search query provided via the first output stream are processed and displayed without any delay associated with grouping the search results into the plurality of sets according to the facet information provided in at least the second output stream; providing the plurality of sets corresponding to the filtered or sortable search results generated according to the facet information for display, in response to finding matching search results that correspond to the facet value range for each set as respective search results become available that match a respective facet value or facet range; and asynchronously generating one or more sets associated with first facet information corresponding to the search results, wherein the sets associated with the first facet information are displayed as second facet information continues to be generated, wherein the search results for a first set corresponding to the first facet information are partially displayed in response to selecting a representation of the first set, and wherein remainder of the search results for the first set are displayed at later time, when additional search results for the first set becomes available.

19 Claims, 6 Drawing Sheets

STREAMING FACETED SEARCH

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to faceted search in a computing environment and, more particularly, to streaming faceted search.

BACKGROUND

Faceted search allows a user to filter search results from a search engine without knowing the internal syntax of the search engine. If a user submits a search query to a search engine, the search engine may return facet information comprising facets and facet values (i.e., search result options) in addition to the regular list of search results. The user may then filter the search results by selecting a facet value.

For example, if a user searches "camera" on an electronics website, the website may display facets such as brand or price. Under the price facet, values such as "Under $200" or "$200 to $300" may be displayed. Then, when the user selects the value "Under $200" the website's search engine reruns the "camera" search query, filtering the original search results according to the price facet value of "Under $200."

Generating facet information consumes memory and I/O (input/output) resources. A search engine with faceted search capability may generate facet information for each search result. Thus, a faceted search may take more time than a regular search, and a large number of results may slow down a search engine's response time to a search query.

Faceted search is useful because it provides users with a user-friendly mechanism for filtering search results. On the other hand, users desire fast response times to search queries and may become frustrated if search results are not displayed until after facet information has been completely generated. Systems and methods are needed that can overcome the above-mentioned shortcomings.

SUMMARY

The present disclosure is directed to systems, methods, and corresponding products that facilitate streaming faceted search.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method is provided. The method comprises receiving a search query; processing the search query to find matching search results and facet information corresponding to the search query, wherein the facet information is not part of the search query, but is used to group the search results into a plurality of sets, such that each set corresponds to a facet value range common to the search results included in said set, so that the search results are filtered based on certain criteria and sortable based on the facet value ranges associated with each set; designating at least a first output stream and a second output stream, wherein data related to the matching search results for the search query is written to the first output stream, and data related to at least a first facet information is written to the second output stream, so that the matching search results for the search query provided via the first output stream are processed and displayed without any delay associated with grouping the search results into the plurality of sets according to the facet information provided in at least the second output stream, providing the plurality of sets corresponding to the filtered or sortable search results generated according to the facet information for display, in response to finding matching search results that correspond to the facet value range for each set as respective search results become available that match a respective facet value or facet range; and asynchronously generating one or more sets associated with first facet information corresponding to the search results, wherein the sets associated with the first facet information are displayed as second facet information continues to be generated, wherein the search results for a first set corresponding to the first facet information are partially displayed in response to selecting a representation of the first set, and wherein remainder of the search results for the first set are displayed at later time, when additional search results for the first set becomes available.

According to another embodiment of the present invention, the method may further include controlling whether the search results are grouped based on facet information by way of enabling or disabling a facet search option, such that if the facet search option is disabled the data related to the matching search results for the search query is written to the first output stream. A browser may read and display the first facet information, in response to determining that the first facet information is ready to be displayed. The determining may include creating a server request, in response to receiving the search query, and polling an attribute associated with the server request at regular time intervals.

According to an additional aspect of the invention, generating the first facet information based on the search results may include collecting document identification numbers for the search results.

The method may also include, in accordance with one embodiment of the present invention, formatting the search results and the first facet information.

In yet another embodiment of the present invention, the first information displayed is updated with the second facet information, in response to determining that the second facet information is ready to be displayed.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate streaming faceted searches.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
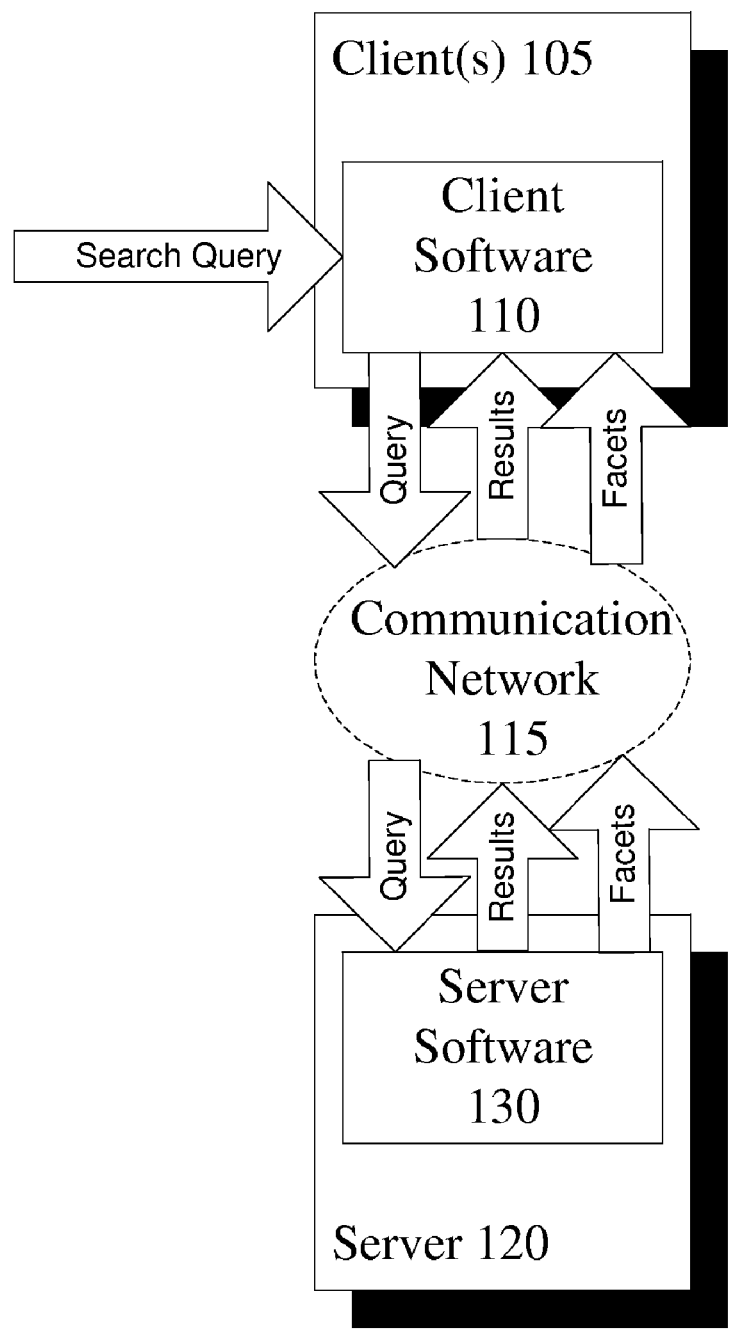
FIG. 1 is a block diagram of an exemplary search environment, in accordance with one embodiment.

Referring to FIG. 1, in accordance with one embodiment, exemplary search environment 100 may comprise a client software 110 (e.g., browser 110) running on a client machine 105 connected to a server 120 over a communication network 115. Server software 130 (e.g., search engine 130) may be executed on server 120 to service requests submitted by one or more client software. Browser 110 may forward a search query to server 120. Server 120 may provide the search query to search engine 130. Search engine may perform a search based on the search query and provide search results and facet information to browser 110 to display.

As provided earlier, existing implementations of faceted search may be slow because search results for a search query are not displayed until after facet information is completely generated. Moreover, a user may be forced to wait for facet information even if the user has no interest in the facet information.

In accordance with one embodiment, the above-mentioned shortcomings may be avoided if search engine 130 processes a submitted search query in different modes. For example, upon receiving a search query submitted by a user, search engine 140 may process the search query with faceted search disabled, returning just search results to the user. Search engine 130 may also run the search query with faceted search enabled, returning facet information to the user.

Processing each search query twice in both of the above two modes has some drawbacks, however. First, some search queries are difficult to process and take a lot of time, so processing a search query twice may also result in a slower response time. Second, if a user is interested in facet information, the user is forced to wait until both search queries are finished processing to access the facet information.

Figure 2:
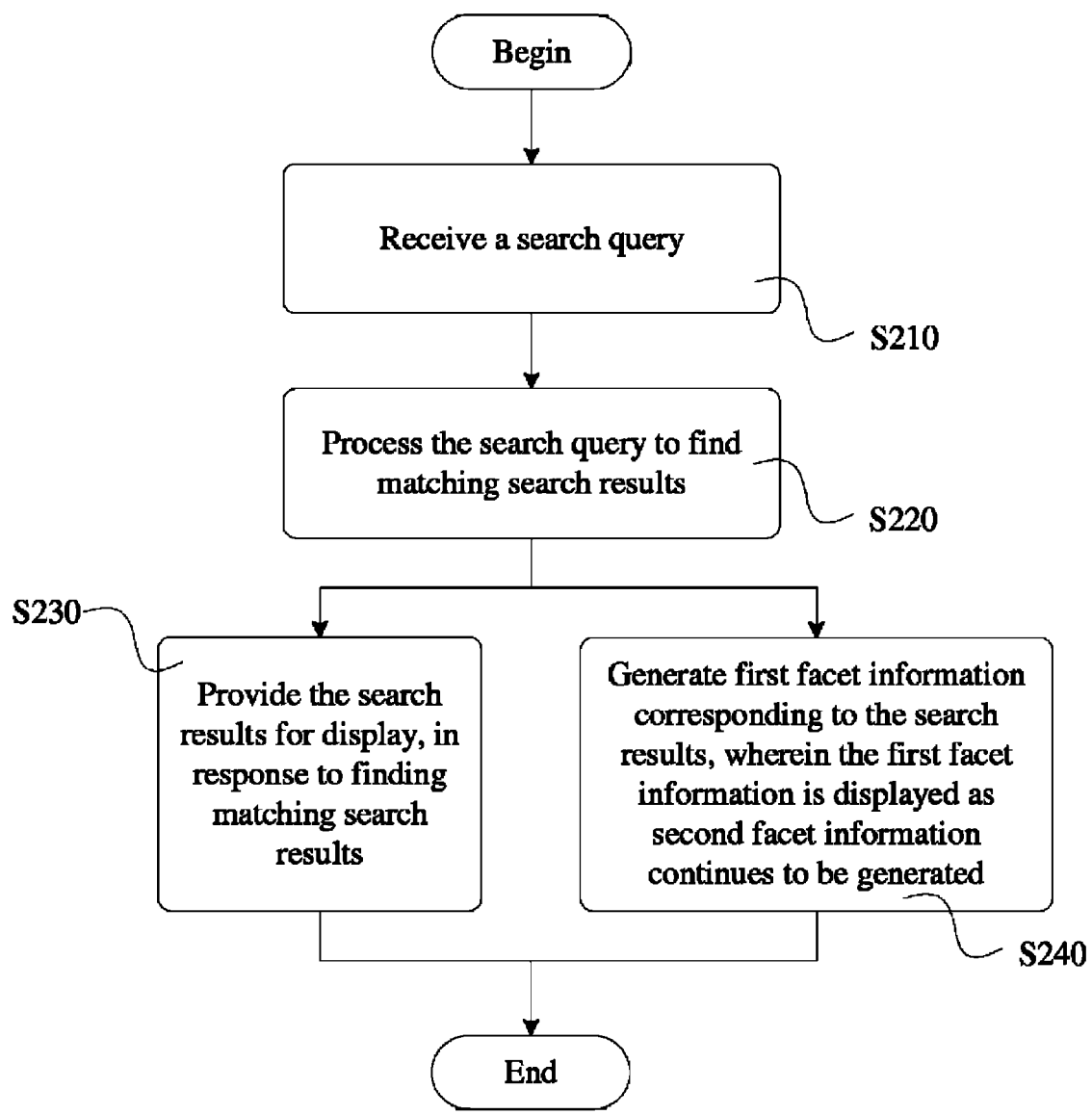
FIG. 2 is a flow diagram an exemplary method for streaming faceted search, in accordance with one embodiment.

In accordance with another embodiment, a more efficient faceted search implementation is provided below. FIG. 2 illustrates a streaming faceted search implementation that displays search results and allows a user to access some facet information before all the facet information has been completely generated.

Referring to FIG. 2, in accordance with one embodiment, for example, search engine 130 may receive a search query submitted by a browser 110 (S210). In response, search engine 130 may process or perform a search on the search query to find matching search results (S220). Upon finding matching search results, search engine 130 may provide the search results for display (S230).

Desirably, concurrent to process S230, search engine 130 may also generate facet information corresponding to the search results and provide some of the facet information to browser 110 for display periodically (e.g., every n results or every n milliseconds) as the rest of the facet information is still being generated (S240). If more facet information becomes ready for display, browser 110 may update the facet information that has already been displayed.

Browser 110 may be configured to support a streaming faceted search, for example, with a search request mechanism (e.g., XMLHttpRequest) that allows browser 110 to communicate with server 120 using asynchronous calls. A search request may comprise an attribute that queries whether data is ready to be displayed. The data may comprise search results or facet information, corresponding to a search query submitted by the user. Browser 110 may differentiate between search results and facet information by having server 120 prefix the data with identifiers (e.g., "@@@RESULTS@@@" and "@@@FACETS@@@," respectively), for example. Asynchronous calls are used so that the user may continue working while the search query is being processed in the background.

Figure 3:
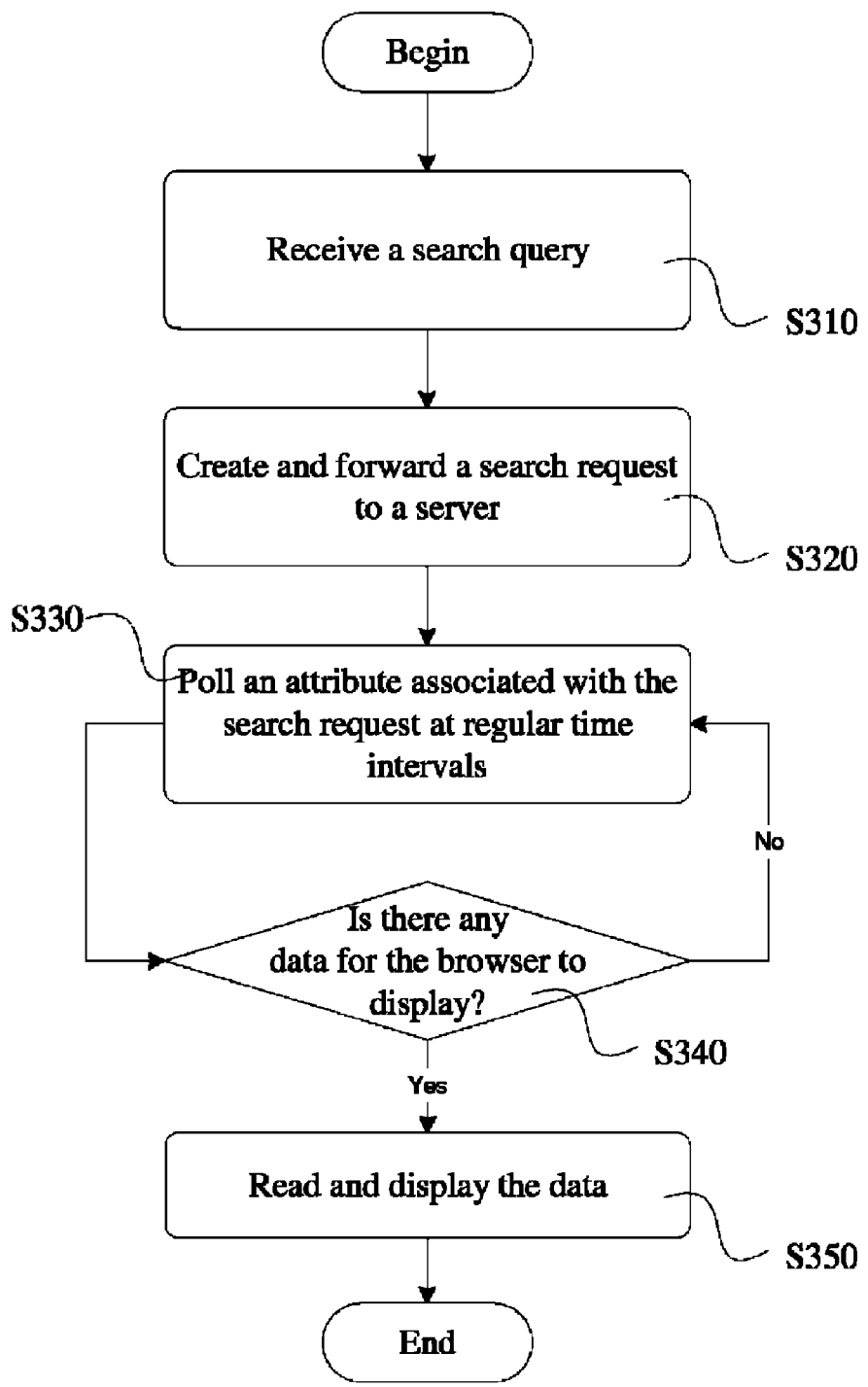
FIG. 3 illustrates configuration of streaming faceted search in a browser, in accordance with one embodiment.

Referring to FIG. 3, in accordance with one embodiment, browser 110 may receive a search query (S310). In response, browser 110 creates and forwards a search request to server 140 (S320). Browser 110 then polls the search request at regular time intervals (S330) to determine whether there is any data for browser 110 to display (S340). If there is, browser 110 reads the data from an appropriate output stream, processes the data, and displays the data (S350).

Figure 4:
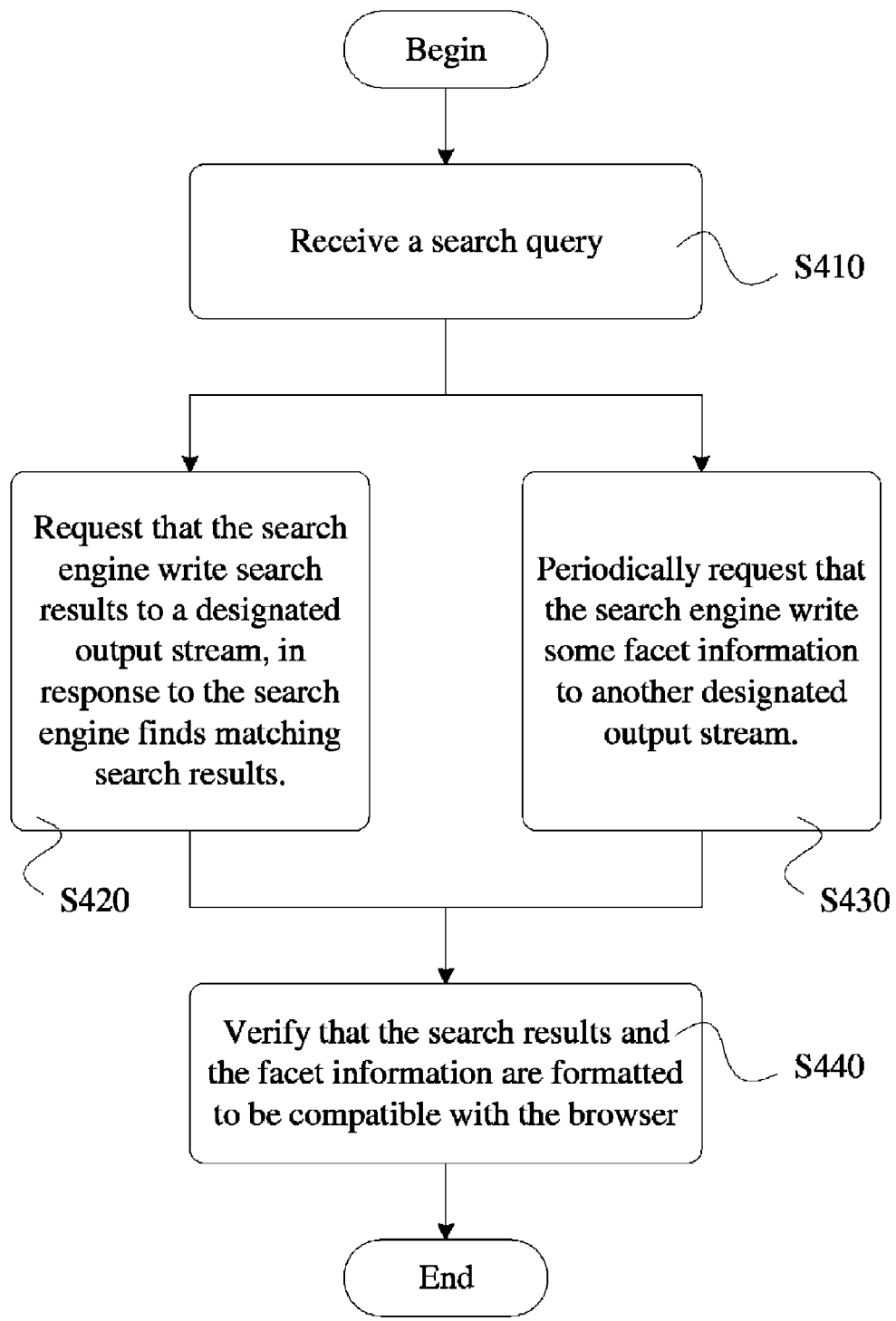
FIG. 4 illustrates configuration of streaming faceted search in a server, in accordance with one embodiment.

Server 120 may be configured to support streaming faceted search with a mechanism (e.g., a servlet) that allows server 120 to communicate with browser 110 and search engine 130. Referring to FIG. 4, in accordance with one embodiment, upon receiving a search query (S410), server 120 may request search engine 130 to write search results to an output stream designated for search results, in response to search engine 130 finding matching search results (S420). Concurrently, server 120 may periodically request search engine 130 to write some facet information to an output stream designated for facet information, while search engine 130 continues to generate the rest of the facet information (S430). Server 120 may also verify that both search results and facet information are formatted to be compatible with browser 110, for display (S440).

Figure 5:
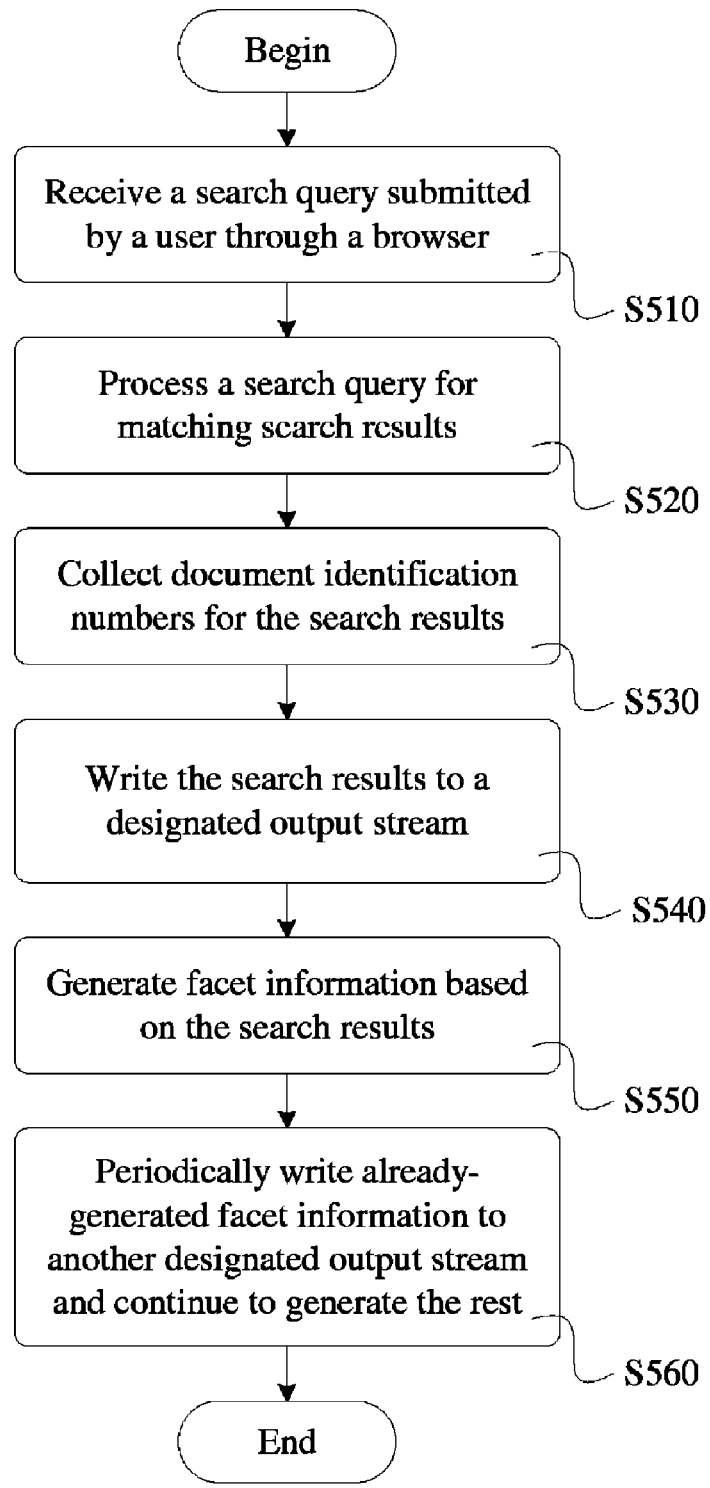
FIG. 5 illustrates configuration of streaming faceted search in a search engine, in accordance with one embodiment.

Search engine 130 may be configured to support streaming faceted search by using a modified search engine architecture that allows search engine 130 to write to output streams. Referring to FIG. 5, in accordance with one embodiment, upon receiving a search query (S510), search engine 130 processes the search query for matching search results (S520) and collects document identification numbers (IDs) for the search results (S530). Search engine 130 returns the search results by writing the search results to an output stream designated for search results (S540). As search engine 130 generates facet information (S550), search engine 130 periodically writes the generated facet information to an output stream designated for facet information (S560).

In different embodiments, the invention may be implemented either entirely in the form of hardware or entirely in the form of software, or in a combination of both hardware and software elements. For example, search environment 100 may be comprised in an exemplary computing environment that by be presented largely in terms of hardware components and software code executed to perform processes that achieve the results contemplated by the system of the present invention.

Figure 6:
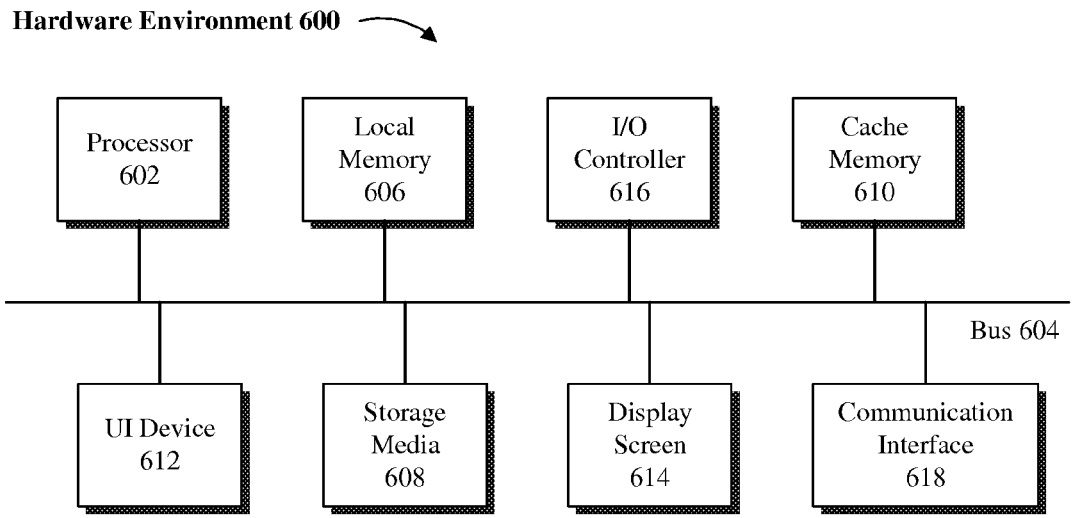
FIGS. 6 and 7 are block diagrams of hardware and software environments in which a system of the present invention may operate, in accordance with one or more embodiments.
Figure 7:
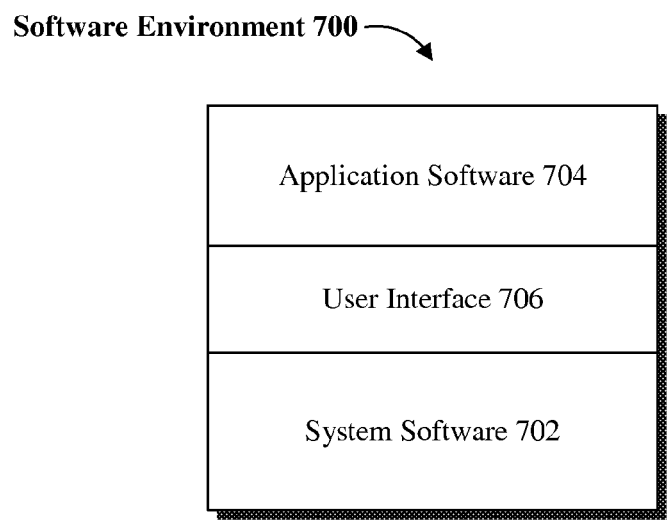

Referring to FIGS. 6 and 7, an exemplary computing environment in accordance with one embodiment is composed of hardware environment 600 and software environment 700. Hardware environment 600 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 700 is divided into two major classes comprising system software 702 and application software 704. System software 702 comprises control programs such as the operating system (OS) and information management systems that instruct the hardware how to function and process information. Application software 704 may comprise, but is not limited to, program code, data structures, firmware, resident software, microcode, or any other form of information or routine that may be read, analyzed, or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 6, system software 702 and application software 704 may be implemented as computer software in the form of computer readable code executed on a data processing system such as hardware environment 600 that comprises a processor 602 coupled to one or more computer readable media or memory elements by way of a system bus 604. The computer readable media or the memory elements, for example, may comprise local memory 606, storage media 608, and cache memory 610. Processor 602 loads executable code from storage media 608 to local memory 606. Cache memory 610 provides temporary storage to reduce the number of times code is loaded from storage media 608 for execution.

A user interface (UI) device 612 (e.g., keyboard, pointing device, etc.) and a display screen 614 may be coupled to the computing system either directly or through an intervening I/O controller 616, for example. A communication interface unit 618, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 600 may not include all the above components, or may comprise other components for additional functionality or utility. For example, hardware environment 600 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 618 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 7, system software 702 and application software 704 may comprise one or more computer programs that are executed on top of an operating system after being loaded from storage media 608 into local memory 606. In a client-server architecture, application software 704 may comprise client software and server software (e.g., search environment 100 from FIG. 1).

Software environment 700 may also a user interface 706 (e.g., a Graphical User Interface (GUI)) for receiving user commands and data. Please note that the hardware and software architectures and environments described above are for purposes of example, and one or more embodiments of the invention may be implemented over any type of system architecture or processing environment.

Additionally, the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method comprising:
    receiving a search query;
    processing the search query to find matching search results and facet information corresponding to the search query, wherein the facet information is not part of the search query, but is used to group the search results into a plurality of sets, such that each set corresponds to a facet value range common to the search results included in said set, so that the search results are filtered based on certain criteria and sortable based on the facet value ranges associated with each set;
    designating at least a first output stream and a second output stream, wherein data related to the matching search results for the search query is written to the first output stream, and data related to at least a first facet information is written to the second output stream, so that the matching search results for the search query provided via the first output stream are processed and displayed without any delay associated with grouping the search results into the plurality of sets according to the facet information provided in at least the second output stream,
    providing the plurality of sets corresponding to the filtered or sortable search results generated according to the facet information for display, in response to finding matching search results that correspond to the facet value range for each set as respective search results become available that match a respective facet value or facet range; and
    asynchronously generating one or more sets associated with first facet information corresponding to the search results,
    wherein the sets associated with the first facet information are displayed as second facet information continues to be generated,
    wherein the search results for a first set corresponding to the first facet information are partially displayed in response to selecting a representation of the first set, and wherein remainder of the search results for the first set are displayed at later time, when additional search results for the first set becomes available.

2. The method of claim 1, further comprising controlling whether the search results are grouped based on facet information by way of enabling or disabling a facet search option, such that if the facet search option is disabled the data related to the matching search results for the search query is written to the first output stream.

3. The method of claim 2, wherein a browser reads and displays the first facet information, in response to determining that the first facet information is ready to be displayed.

4. The method of claim 3, wherein the determining comprises:
    creating a server request, in response to receiving the search query; and
    polling an attribute associated with the server request at regular time intervals.

5. The method of claim 1, wherein generating the first facet information based on the search results comprises collecting document identification numbers for the search results.

6. The method of claim 1, further comprising formatting the search results and the first facet information.

7. The method of claim 1, wherein first information displayed is updated with the second facet information, in response to determining that the second facet information is ready to be displayed.

8. A system comprising:
    a processor for receiving a search query;
    a processor for processing the search query to find matching search results and facet information corresponding to the search query, wherein the facet information is not part of the search query, but is used to group the search results into a plurality of sets, such that each set corresponds to a facet value range common to the search results included in said set, so that the search results are filtered based on certain criteria and sortable based on the facet value ranges associated with each set;
    a processor for designating at least a first output stream and a second output stream, wherein data related to the matching search results for the search query is written to the first output stream, and data related to at least a first facet information is written to the second output stream, so that the matching search results for the search query provided via the first output stream are processed and displayed without any delay associated with grouping the search results into the plurality of sets according to the facet information provided in at least the second output stream,
    a processor for providing the plurality of sets corresponding to the filtered or sortable search results generated according to the facet information for display, in response to finding matching search results that correspond to the facet value range for each set as respective search results become available that match a respective facet value or facet range; and
    a processor for asynchronously generating one or more sets associated with first facet information corresponding to the search results,
    wherein the sets associated with the first facet information are displayed as second facet information continues to be generated,
    wherein the search results for a first set corresponding to the first facet information are partially displayed in response to selecting a representation of the first set, and wherein remainder of the search results for the first set are displayed at later time, when additional search results for the first set become available.

9. The system of claim 8, further comprising a processor for controlling whether the search results are grouped based on facet information by way of enabling or disabling a facet search option, such that if the facet search option is disabled the data related to the matching search results for the search query is written to the first output stream.

10. The system of claim 9, further comprising:
    a processor for determining whether the first facet information is ready to be displayed;
    a processor for creating a server request, in response to receiving the search query; and a processor for polling an attribute associated with the server request at regular time intervals.

11. The system of claim 8, wherein generating the first facet information based on the search results comprises collecting document identification numbers for the search results.

12. The system of claim 8, further comprising a processor for formatting the search results and the first facet information.

13. The system of claim 8, further comprising a processor for updating first information displayed with the second facet information, in response to determining that the second facet information is ready to be displayed.

14. A computer program product comprising a tangible computer useable storage medium having a computer readable program stored thereon, wherein the computer readable program when executed on a computer causes the computer to:

receive a search query;

process the search query to find matching search results and facet information corresponding to the search query, wherein the facet information is not part of the search query, but is used to group the search results into a plurality of sets, such that each set corresponds to a facet value range common to the search results included in said set, so that the search results are filtered based on certain criteria and sortable based on the facet value ranges associated with each set;

designate at least a first output stream and a second output stream, wherein data related to the matching search results for the search query is written to the first output stream, and data related to at least a first facet information is written to the second output stream, so that the matching search results for the search query provided via the first output stream are processed and displayed without any delay associated with grouping the search results into the plurality of sets according to the facet information provided in at least the second output stream, provide the plurality of sets corresponding to the filtered or sortable search results generated according to the facet information for display, in response to finding matching search results that correspond to the facet value range for each set as respective search results become available that match a respective facet value or facet range; and asynchronously generate one or more sets associated with first facet information corresponding to the search results, wherein the sets associated with the first facet information are displayed as second facet information continues to be generated, wherein the search results for a first set corresponding to the first facet information are partially displayed in response to selecting a representation of the first set, and wherein remainder of the search results for the first set are displayed at later time, when additional search results for the first set become available.

15. The computer program product of claim 14, wherein the computer readable program when executed on a computer further causes the computer to control whether the search results are grouped based on facet information by way of enabling or disabling a facet search option, such that if the facet search option is disabled the data related to the matching search results for the search query is written to the first output stream write data to one or more designated output streams, wherein the data comprises the search results or the first facet information.

16. The computer program product of claim 15, wherein the computer readable program when executed on a computer further causes the computer to read and display the first facet information, in response to determining that the first facet information is ready to be displayed.

17. The computer program product of claim 16, wherein the computer readable program when executed on a computer further causes the computer to:

create a server request, in response to receiving the search query; and poll an attribute associated with the server request at regular time intervals.

18. The computer program product of claim 14, wherein the computer readable program when executed on a computer further causes the computer to collect document identification numbers for the search results.

19. The computer program product of claim 14, wherein the computer readable program when executed on a computer further causes the computer to format the search results and the first facet information.

* * * * *